Patented Jan. 1, 1952

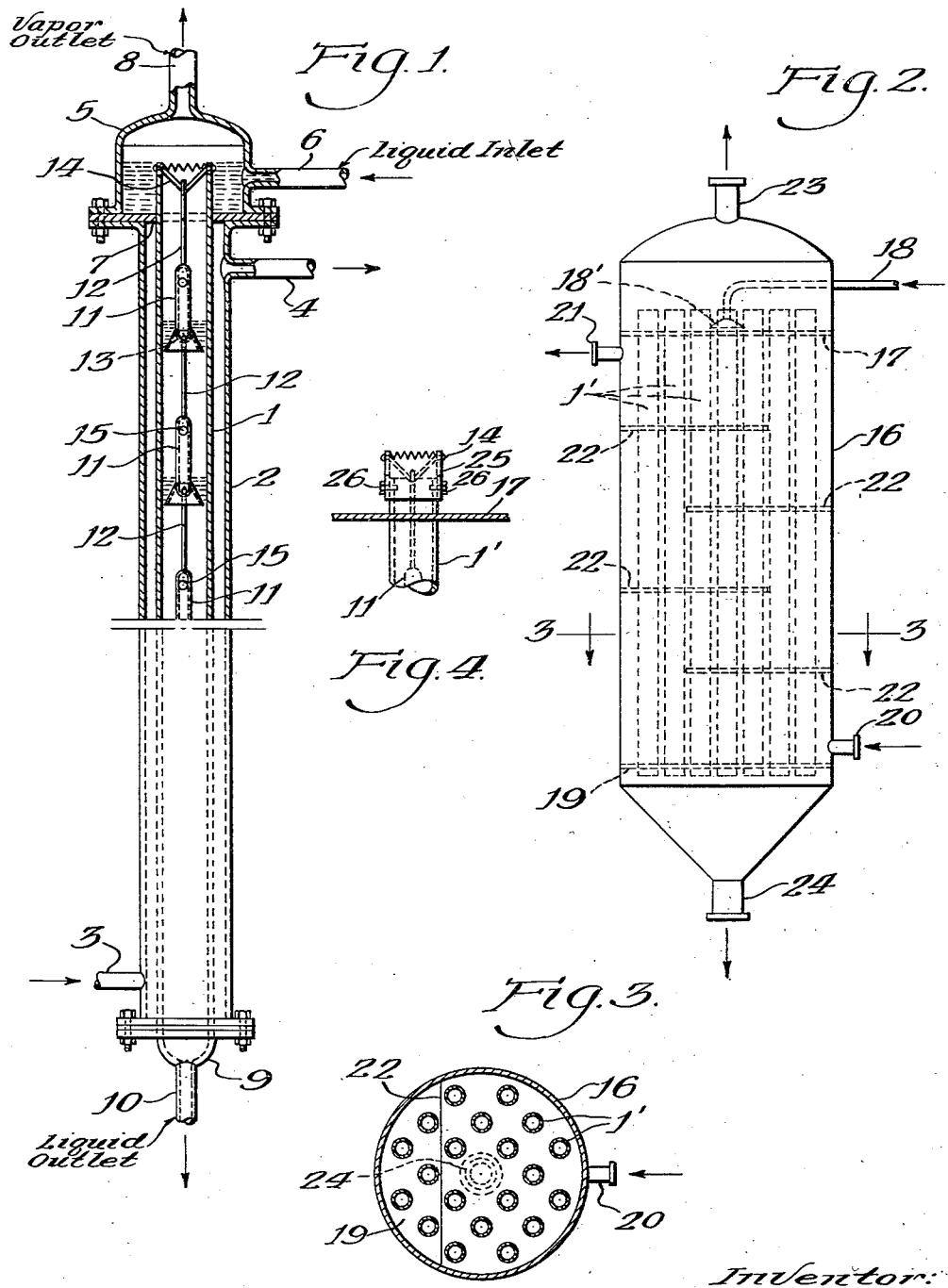

2,580,646

UNITED STATES PATENT OFFICE 2,580,646

DISTILLATION TOWER

Donald H. Belden, Berwyn, Ill., assignor to Universal Oil Products Company, Chicago, Ill., a corporation of Delaware Application April 14, 1948, Serial No. 21,042

5 Claims. (Cl. 202—154)

This invention relates to an improved apparatus for effecting the distillation of a volatile material from a liquid stream. More specifically the improvement is directed to a wall film type of distillation tower having means for redistributing the liquid stream into new wall films and providing thereby a multiple stage heating and distillation or stripping operation.

In the usual wetted-wall or falling-film type of distillation tower, or stripping column, the liquid charge is introduced in a manner to descend in a thin film along the wall of the tube or chamber which is in turn heated externally. This type of tower may provide a preferable temperature gradient in carrying out certain distillation or fractionating operations. Also, the operation may be preferable, or necessary, for distilling and stripping out a component from a material which is viscous or has a tendency to bubble and froth and where a normal distillation procedure or liquid and vapor contact in a contact type of chamber would cause large bubbles and foam which in turn would prevent a clean cut separation or stripping operation. Further, it has been noted that a usual form of falling-film tower does not adequately provide an efficient separation of a volatile or gaseous component from certain viscous streams, for as the wall film is heated and bubbles of the volatile component are librated, droplets of the liquid may be caused to leave the wall surface and drop through the center of the column, or in some cases, the descending film is forced away from the wall of the tube or column and an inefficient distillation or stripping operation results.

It is therefore a principal object of this invention to provide an improved falling-film distillation tower which has internal liquid distributing means to collect free falling liquid droplets and form new wall films from which the volatile component may be stripped.

It is also an object of the invention to provide a plurality of removable and suspended type of liquid distributing members within a wetted wall or falling-film type of tower to form an improved distillation unit.

The improved falling-film stripper of the present invention comprises, briefly, an elongated distillation tube, means to pass a heating medium around the distillation tube, means distributing a liquid film to the inside wall of said distillation tube, spaced and elongated liquid distributing baffles within the tube, each of the distributing baffles having a flared lower portion spaced concentrically within the distillation tower in a manner to collect and redistribute liquid into new wall films and having an extended upper portion with vapor outlet openings therein whereby distilled vapors may travel upwardly through the central portion of the distillation tube, liquid outlet means at the lower end of the distillation tube, and vapor outlet means at the upper end thereof to remove the distilled product or products.

The improved apparatus is thus constructed and arranged to collect liquid, which is displaced from the wall, and to form new films from which the more volatile component, or components, can be distilled. By the use of several redistributing stages the distillation or stripping operation is ordinarily completed to the extent that the wall film is no longer displaced or disturbed and an efficient falling-film distillation or separation process is attained.

Several advantageous construction features are provided in the present invention. For example the liquid redistributing baffles are specially shaped and removable, having a flared or hollow cone-shaped lower end, a tubular upper portion with vapor openings, and hook and linkage means for connecting each of the members in a manner to be removably suspended from the top of the unit.

Another feature of the improved distillation tube as provided by this invention, is an easily adjustable weir at the upper end of each of the distillation tubes whereby substantially equal quantities of liquid may be distributed to each of the distillation tubes of a plurality of tubes maintained in a common housing or chamber. An adjustable weir is particularly necessary for the falling-film type of distillation tube which is being used with a viscous liquid stream, such as the present invention is designed to accommodate in a particularly efficient manner. With a single liquid supply source, and with a viscous material, a considerable liquid gradient is likely to occur across a liquid distributing tube sheet or plate, so that those tubes which are farthest from the source of supply would receive little or no liquid if their upper ends were not somewhat lower than the ends or inlet weirs of the tubes nearer the source of supply.

Other advantageous features will be noted upon reference to the accompanying drawing and the following description thereof.

Figure 1 of the drawing is an elevational view partially in section of an individual improved falling-film distillation unit.

Figure 2 of the drawing is an elevational diagrammatic view of a distillation chamber having a plurality of improved distillation tubes positioned therein.

Figure 3 is a sectional plan view through the chamber of Figure 2 as indicated by the line 3—3 therein.

Figure 4 indicates the adjustable height weir construction of the upper end of one of the improved distillation units, which is particularly useful within a chamber having a plurality of the distillation tubes.

Referring now to Figure 1 of the drawing, there is indicated a distillation tube 1 which is placed inside of a jacket or outer tubular housing 2 so that an external source of heat may be applied around the distillation tube 1. A heating fluid or gaseous medium is supplied to the jacketed space by way of inlet 3 connecting with the lower end of the outer tube 2 and is discharged through an outlet 4 connecting with the upper end of the jacket 2.

In the particular embodiment shown, the liquid stream having a component to be distilled or stripped therefrom is supplied to an upper liquid distributing chamber 5 by means of a liquid inlet 6. The chamber 5 is separated from the interior of the jacketing heating chamber 2 by means of a separating and tube supporting plate 7 which is mounted between the bolting flange on the liquid distributing chamber 5 and an upper flange on the jacket 2. The distillation tube 1 is attached to and supported by the plate 7 in a manner to have its upper end extend a short distance up into the chamber 5 so that the liquid supplied thereto will be maintained in a liquid pool which may in turn be distributed over the top of tube 1 and into the interior thereof as a descending liquid film. The upper end of the tube 1 is preferably serrated to provide a substantially uniform distribution of the liquid to the entire circumference of the inner wall of the tube.

At the upper end of the liquid distributing chamber 5, a vapor outlet 8 provides means for removing distilled vapors and gaseous products. While at the lower end of the unit, a bolting flange on the lower end of tubular jacket 2 and a flanged head 9 having an outlet 10 provides means for discharging the resulting unvaporized liquid from the distillation tube 1. The flange of head 9 may be gasketed and provide means for sealing the lower end of the heating space between tubes 1 and 2 and to prevent its communication with the distillation zone.

Within the upper portion of the distillation tube 1 are provided a plurality of liquid distributing members 11 which are suspended one from another and from the top of tube 1 in a removable manner. Each liquid distributing member 11 has an upper link or hook-like member 12 and a lower loop or rod-like member 13 suitable to engage the hook of the next lower member. A bar 14 is provided across the top of the distillation tube 1 to engage the hook 12 of the upper liquid distributing member of the series.

The main body of each of the liquid distributing members 11 comprises a lower flared or frustro-conical skirt the outer periphery of which is spaced a short distance from the inside of the wall of tube 1 so that liquid droplets or displaced liquid from the wall film may be collected thereabove for redistribution into a new thin wall film to descend along the inner wall of the distillation tube. The upper portion of the liquid distributing member is an elongated hollow tube-like section which has at the upper end thereof one or more vapor outlet openings 15 to allow distilled or stripped vaporous material to pass upwardly therethrough and to ascend through the central portion of the distillation tube and be discharged from the unit by way of the vapor outlet 8. The vapor openings 15 are preferably at the upper end of the tubular portion in order to insure that they remain above the level of the liquid which is accumulated above each of the liquid distributing skirts.

In operation, the liquid wall film descends from the top of the distillation tube 1, within the chamber 5, and encounters the heating zone, which is provided by the heating medium surrounding the exterior of tube 1 and the distillation or stripping action begins. The light volatile component is vaporized and distilled from the wall film in the column and passes upwardly through the center of the tube. However, as noted hereinabove, where certain types of viscous or frothy types of liquid are encountered, during the distillation or vaporization of the volatile component, the film tends to be dislodged along with liquid droplets and to therefore fall downwardly through the distillation tube away from the wall surface. Thus, as provided by this unit, the liquid builds up above the flared skirt portion of the first liquid distributing member and is gradually dissipated in a new wall film which descends along the interior of the distillation tube 1. In like manner, the next lower liquid distributing member 11 accumulates the displaced liquid droplets or portions of the wall film above its flared section and it redistributes the liquid into a new wall film. After several stages of redistribution, the major portion of the volatile component to be distilled or stripped out of the liquid stream, is removed to the extent that the liquid wall film will no longer be dislodged, and normally the lower portion of the distillation tube 1 need not have the distributing members therein, so that it may function as a usual type of falling-film or wetted-wall distillation tube.

A particular advantage of this type of liquid distributing member is the fact that they are easily removed from within the distillation tube for cleaning or for replacement purposes. Also, additional distributing members may be easily added to the unit, if it is found that a larger number of the members are needed to effect an efficient distillation, or alternatively, one or more film distributors may be easily removed where a lesser number may be used. Though not indicated in the drawing, small spacing lugs or projections may be provided around the periphery of each of the liquid distributing units in order to insure its concentric and uniform placement within the distillation tube 1.

The distillation tube 1 of this drawing is shown to be heated with a circulating fluid medium, however, steam coils, electric resistance heating units or other type of heating means may well be arranged around the tube to supply heat for the distillation operation.

Refering now to Figure 2 of the drawing, there is indicated a large enclosed housing or chamber 16 having a plurality of distillation tubes 1' positioned therein, each of which are similar to the tube 1 of Figure 1, and each having therein a plurality of the liquid distributing members 11. Tube sheet 17 at the upper end of the chamber serves to support the tubes 1', to separate the central portion of the chamber 16 from the upper section thereof, and to receive the liquid which is being distributed to each of the distillation tubes. The liquid stream to undergo distillation or stripping, passes to the upper end of the chamber 16 by way of line 18 and distributing nozzle 18', which in this embodiment, terminates just above plate 17 at the center of the chamber 16.

At the lower end of each of the distillation tubes 1' is a second tube sheet 19 which connects with and supports the latter and also separates the central portion of the chamber 16 from the outlet end of each of the distillation tubes. There is thus formed between tube sheets 17 and 19 a heating zone which accommodates a liquid or gaseous medium for surrounding each of the distillation tubes 1'. An inlet nozzle 20 connects with chamber 16 and the lower end of the heating zone to supply a heating medium thereto, while an outlet nozzle 21 connects with a chamber 16 at a point below tube sheet 17 to provide means for discharging the heating medium from the chamber. Also, in the particular embodiment shown, a plurality of baffles 22 are staggered vertically within the heating zone of the central portion of chamber 16 in order to provide a controlled flow of the heating medium up through the chamber and around the plurality of distillation tubes 1'.

The upper head of chamber 16 has a vapor outlet nozzle 23 suitable for discharging the distilled or stripped product from the liquid charge, and the lower head of the chamber has a liquid outlet nozzle 24 suitable to discharge remaining liquid material from the distillation unit.

Figure 3 of the drawing indicates one possible arrangement of the tubes 1' within the chamber 16. However, it should of course be understood that this multi-tube embodiment is not limited to any particular number of distillation tubes 1', or to any particular pattern or arrangement of tubes within the chamber.

Figure 4 of the drawing is an enlarged view of the upper end of one of the tubes 1' such as maintained within the chamber 16 of Figure 2 of the drawing. The upper end of each of the tubes 1' has a movable collar or adjustable weir member 25, which is adjustable vertically and thereby provides means for changing the weir height above the tube sheet 17. In this embodiment, cap screws 26 engage the tube 1' and pass through vertical slots on both sides of the adjustable weir member 25. Thus, upon loosening the screws 26 the member 25 may be moved up or down to the desired height above plate 17, the screws 26 tightened and the weir member 25 thereby clamped to a set position. Where the liquid inlet 18 and distributing nozzle 18' terminates in a center position within the chamber 16, as indicated in this embodiment, the upper ends of the weir 25 of each of the tubes 1' which are around the outside of the chamber, will of course necessarily be adjusted to a lower height than those which are near the center and near the liquid distributing point. Observation and measurement of the liquid gradient of the particular stream which is to be stripped or distilled permits means for determining the adjustment of the weirs 25 on each of the plurality of tubes to in turn provide a substantially uniform flow and liquid distribution to each of the distillation tubes.

The adjustable weirs at the upper end of each of the distillation tubes, as indicated in Figure 4,
have a toothed or serrated upper edge, however, it may be noted that this particular type of serration is not a part of this invention, for obviously other types of serration or none, where a leveling arrangement is possible, may provide an equally efficient operating unit. It should also be noted, that the spacing between the various liquid distributing members 11 may be varied by the length of the links or hooks 12 to suit optimum conditions of vapor displacement and liquid flow, and that the number of liquid distributing members used in any one distillation unit may be varied as necessary with the particular type of liquid stream and its tendency to be displaced from the wall of the distillation tube.

I claim as my invention:

1. A distillation unit comprising in combination, a vertically elongated distillation tube, heating means for said distillation tube, liquid inlet means at the upper end of said distillation tube for distributing a liquid film to the inside wall thereof, spaced liquid distributing baffles within the upper portion and removably suspended from the top of said distillation tube and detachably connected to each other by hook and linkage means, each of said distributing baffles having a tubular upper portion and a flared lower skirt portion, the latter spaced concentrically within and close to said distillation tube to form new liquid wall films, said tubular upper portion having vapor outlets discharging into the interior of said tube whereby distilled vapor may travel upwardly through the central portion of said distillation tube, a vapor outlet at the upper end of said distillation tube and liquid outlet means at the lower end thereof suitable to discharge the unvaporized portion of said liquid stream.

2. A distillation unit comprising in combination, a vertically elongated and open ended distillation tube, an outer jacket spaced around said tube having inlet and outlet means thereto to pass a fluid heating medium around said distillation tube, a liquid receiving section at the upper end of said distillation tube having a liquid inlet thereto and means supplying a uniform falling liquid film to the inside of said distillation tube, a plurality of vertically spaced liquid distributing members within the upper portion and removably suspended from the top of said distillation tube and detachably connected to each other by hook and linkage means, each of said members having an extended tubular upper end with vapor outlet means discharging into the interior of said tube and a lower frusto-conical flared skirt portion having its outer periphery spaced a short distance from the inside wall of said distillation tube, a vapor outlet opening at the top of said unit, and a liquid outlet at the lower end thereof.

3. A distillation unit comprising in combination a vertically positioned inclosed chamber, a plurality of vertically positioned and open ended distillation tubes spaced within said chamber, upper and lower tube sheets across said chamber at the upper and lower ends of said plurality of distillation tubes, said tube sheets separating the upper and lower ends of said tubes from a central heating portion formed thereby within said chamber, liquid inlet and distributing means above the upper tube sheet supplying liquid wall films to each of said distillation tubes, a plurality of liquid distributing members spaced vertically within each of said distillation tubes and detachably connected to each other by hook and linkage means, each of said distribution members having a frusto-conical lower skirt portion spaced a short distance from the inside wall of said tube in a manner to redistribute liquid wall films thereto and each having extended upper tubular portions with vapor outlet openings discharging into the interior of the tube to channel vapor upwardly through the central portion of each of said distillation tubes, each of said distillation tubes having a vertically removable upper portion suitable to provide a varying weir height above the upper tube plate and to thereby adjust liquid flow to each of said distillation tubes positioned within said chamber, a liquid outlet at the lower end of said chamber, a vapor outlet at the top of said chamber, and inlet and outlet means to said central portion of said chamber for passing a heating medium around each of said plurality of distillation tubes.

4. The distillation unit of claim 3 further characterized in that the plurality of liquid distributing members within each of said distillation tubes are removably suspended from the top of each of said distillation tubes.

5. A distillation unit comprising in combination, a vertically elongated distillation tube, heating means for said distillation tube, liquid inlet means at the upper end of said distillation tube for distributing a liquid film to the inside wall thereof, spaced liquid distributing baffles within the upper portion of said distillation tube, each of said distributing baffles having a tubular upper portion and a flared lower skirt portion, the latter spaced concentrically within and close to said distillation tube to form new liquid wall films, said tubular upper portion having vapor outlets discharging into the interior of said tube whereby distilled vapor may travel upwardly through the central portion of said distillation tube, a hook-like member extending upwardly from the tubular portion of a lower baffle and engaging a suspending member on the skirt portion of the next higher baffle, means for removably suspending the baffles from the top of the distillation tube, a vapor outlet at the upper end of said distillation tube and liquid outlet means at the lower end thereof suitable to discharge the unvaporized portion of said liquid stream.

DONALD H. BELDEN.

REFERENCES CITED

The following references are of record in the file of this patent:

UNITED STATES PATENTS

| Number | Name | Date |
|---|---|---|
| 499,567 | Normand | June 13, 1893 |
| 996,736 | Trumble | July 4, 1911 |
| 1,070,361 | Trumble | Aug. 12, 1913 |
| 1,182,601 | Trumble | May 9, 1916 |
| 1,250,052 | Trumble | Dec. 11, 1917 |
| 1,262,875 | Trumble | Apr. 16, 1918 |
| 1,323,013 | Christie | Nov. 25, 1919 |
| 2,266,941 | Van de Griendt | Dec. 23, 1941 |
| 2,295,088 | Kleucker | Sept. 8, 1942 |

FOREIGN PATENTS

| Number | Country | Date |
|---|---|---|
| 321,937 | Germany | June 15, 1920 |